United States Patent
Jing (10) Patent No.: US 10,579,210 B2
(45) Date of Patent: Mar. 3, 2020

(54) DISPLAY CONTROL METHOD, DISPLAY CONTROL DEVICE AND TERMINAL FOR DISPLAYING APPLICATION ICONS

(71) Applicant: YULONG COMPUTER TELECOMMUNICATION SCIENTIFIC (SHENZHEN) CO., LTD., Shenzhen (CN)

(72) Inventor: Xueying Jing, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 570 days.

(21) Appl. No.: 15/214,338

(22) Filed: Jul. 19, 2016

(65) Prior Publication Data
US 2016/0328119 A1    Nov. 10, 2016

Related U.S. Application Data (63) Continuation-in-part of application No. PCT/CN2014/071459, filed on Jan. 26, 2014.

(51) Int. Cl.
*G06F 3/0481* (2013.01)
*G06F 3/0482* (2013.01)
*G06F 3/0488* (2013.01)

(52) U.S. Cl.
CPC ........ *G06F 3/04817* (2013.01); *G06F 3/0482* (2013.01); *G06F 3/04883* (2013.01)

(58) Field of Classification Search
CPC .. G06F 3/04817; G06F 3/0482; G06F 3/0488; G06F 3/04883
See application file for complete search history.

(56) References Cited

U.S. PATENT DOCUMENTS

2007/0101297 A1    5/2007  Forstall et al.
2007/0277124 A1*  11/2007  Shin ................... G06F 3/04883
                                                       715/863

(Continued)

FOREIGN PATENT DOCUMENTS

CN          101859229          10/2010
CN          DN102439558         5/2012
(Continued)

OTHER PUBLICATIONS

Communication pursuant to Article 94(3) EPC issued in corresponding European Application No. 14 879 882.0-1221, dated Feb. 6, 2019, 8 pages.

*Primary Examiner* — Tan H Tran (74) *Attorney, Agent, or Firm* — Bayes PLLC (57) ABSTRACT

The present invention provides a display control method, a display control device and a terminal. The display control method includes: arranging, in a gap area between application icons on a terminal screen, an application icon not present on a current menu page of the terminal or an application icon not present on each of all the menu pages of the terminal. The present invention fully utilizes the gap area between the application icons to arrange specific application icons, and by means of a change mode or a specific gesture operation, the handover between hiding and display is realized, thereby enriching the display control modes of the application icons.

15 Claims, 5 Drawing Sheets

(56) References Cited

U.S. PATENT DOCUMENTS

| | | | |
|---|---|---|---|
| 2008/0074399 A1* | 3/2008 | Lee | G06F 3/0482 345/173 |
| 2011/0252346 A1 | 10/2011 | Chaudhri | |
| 2012/0071208 A1* | 3/2012 | Lee | H04M 1/72544 455/566 |
| 2012/0151400 A1* | 6/2012 | Hong | G06F 3/04817 715/769 |
| 2012/0274581 A1* | 11/2012 | Kim | G06F 3/0482 345/173 |
| 2012/0293421 A1 | 11/2012 | Santoro | |

FOREIGN PATENT DOCUMENTS

| | | |
|---|---|---|
| CN | 103019592 A | 4/2013 |
| CN | 103279278 | 3/2016 |
| WO | 2013127055 A1 | 9/2013 |

* cited by examiner

DISPLAY CONTROL METHOD, DISPLAY CONTROL DEVICE AND TERMINAL FOR DISPLAYING APPLICATION ICONS

FIELD OF THE INVENTION

The present invention relates to the technical field of communications, and in particular, to a display control method, a display control device and a terminal.

BACKGROUND OF THE INVENTION

The screen size of a terminal becomes larger and larger, the number of application icons capable of being displayed on each menu page becomes more and more, and meanwhile, the gaps between the application icons becomes larger. The gaps between the application icons can form a set of grid paths, and how to utilize the set of grid paths to enrich the display control mode of the application icons has not been proposed in related technology at present.

SUMMARY OF THE INVENTION

Based on the above technical problems, the present invention provides a new display control technology, which can fully utilize the gaps between application icons to enrich the display control mode of the application icons.

In view of this, according to one aspect of the present invention, a display control method is provided, including: arranging, in a gap area between application icons on a terminal screen, an application icon not present on a current menu page of the terminal or an application icon not present on each of all the menu pages of the terminal.

With the increase of the screen size, the gap areas between the application icons become larger as well, in order to utilize these gap areas, certain specific application icons can be arranged in the gap areas, and the specific application icons can be application icons of shortcut operations, application icons or control identifiers or shortcut entry identifiers involving user privacy, application icons often used by a user but not present in the current menu page, or application icons not arranged on each of all the menu pages, and so on. In this way, not only the application icons accommodated in each menu page are increased, the user is convenient to use some common applications, and the number of the menu pages can also be decreased.

In the above technical solution, preferably, identifying an operation track of the user acting on the terminal screen; judging whether the operation track is consistent with the run of a grid path, wherein the grid path is composed of the gap areas between the application icons on a terminal desktop; and if so, executing shortcut operations associated with the applications scribed by the operation track.

The application icons on the terminal desktop are regularly arranged in general, for example, in a grid manner, and the application icons naturally form a set of grid paths based on gaps.

The user can execute various touch operations on the terminal screen, the terminal identifies the tracks of the touch actions, and when the tracks of the touch operations conform to the requirements of the grid path, certain shortcut operations can be triggered and executed. In order to solve the problem of mistrigger, in the solution, it is defined that only when the operation track of the user conforms to the run of the grid path, the operation track is deemed to conform to the requirements, and the operation track can involve a plurality of applications, and when the operation track conforms to the requirements, certain shortcut operations can be executed for these involved applications, for example, these applications are collaboratively associated or the display mode of the terminal is changed.

In any above technical solution, preferably, when receiving a trigger of the user, the application icon in the gap area is displayed, and when not receiving the trigger of the user, the application icon in the gap area is hidden.

To protect the user privacy and avoid the influence on the original menu interface as much as possible, under normal circumstances, the application icons arranged at the gap are hidden, and only when the user needs the application icons, these application icons are displayed in a specific operation mode.

In any above technical solution, preferably, when the application icon arranged in the gap area is used as the starting point of the operation track, an association relationship between an application identified by the application icon located on the starting point and the applications identified by other application icons on the operation track is established, and then an association operation related to the application icon at the starting point is completed.

When arranging the application icon in the gap, the user can establish a certain association relationship between other application icons on the desktop and the application icon in the gap with the application icon in the gap as the operation starting point, and the association relationship is related to the function type of the application icon at the starting point of the operation track. For example, if the application icon at the starting point is synchronization cloud (SYNC cloud), the association relationship is established for the other applications on the operation track and the synchronization cloud, and the data of other applications are synchronized to the cloud through the synchronization cloud.

In any above technical solution, preferably, the association operation includes at least one of the following: implementing data synchronization on the applications scribed by the operation track, synchronizing the data of the applications to the cloud, binding the accounts of the applications to the cloud and/or binding the accounts of the applications to each other.

In any above technical solution, preferably, the application icon arranged in the gap area between the application icons includes a mode handover switch identifier.

In any above technical solution, preferably, when the mode handover switch identifier is used as the starting point of the operation track, hidden display or amplified display is carried out on the application icons located on the operation track, and the arrangement positions of the application icons on the terminal are redeployed to complete the display mode handover of the terminal.

Besides the association and collaboration of the applications, the shortcut operation can also carry out handover on the display mode. In view of different display modes of the terminal, the requirements on the display states of the application icons are different. For example, in a children mode, game applications are expected to be hidden, then the user can scribe the game applications along the run of the grid path with the handover switch identifier as the starting point to simultaneously hide the scribed game applications instead of deleting or hiding the game applications one by one, thereby facilitating the operation of the user.

According to another aspect of the present invention, a display control device is further provided, including: a display control unit used for arranging, in a gap area between application icons on a terminal screen, an application icon not present on a current menu page of the terminal or an application icon not present on each of all the menu pages of the terminal.

With the increase of the screen size, the gap areas between the application icons become larger as well, in order to utilize these gap areas, certain specific application icons can be arranged in the gap areas, and the specific application icons can be application icons of shortcut operations, application icons involving user privacy, application icons often used by a user but not present in the current menu page, or application icons not arranged on each of all the menu pages, and so on. In this way, not only the application icons accommodated in each menu page are increased, and the user is convenient to use some common applications.

In the above technical solution, preferably, the display control device can further include: an identification unit, used for identifying an operation track of the user acting on the terminal screen; a judging unit, connected to the identification unit and used for judging whether the operation track is consistent with the run of a grid path, wherein the grid path is composed of the gap areas between the application icons on a terminal desktop; and an execution unit, connected to the judging unit and used for executing shortcut operations associated with the applications scribed by the operation track, when the judgment result of the judging unit is positive.

The user can execute various touch operations on the terminal screen, the terminal identifies the tracks of the touch actions, and when the tracks of the touch operations conform to the requirements of the grid path, certain shortcut operations can be triggered and executed. In order to solve the problem of mistrigger, in the solution, it is defined that only when the operation track of the user conforms to the run of the grid path, the operation track is deemed to conform to the requirements, and the operation track can involve a plurality of applications, and when the operation track conforms to the requirements, certain shortcut operations can be executed for these involved applications, for example, these applications are collaboratively associated or the display mode of the terminal is changed.

In any above technical solution, preferably, the display control unit is further used for, when receiving a trigger of the user, displaying the application icon in the gap area, and when not receiving the trigger of the user, hiding the application icon in the gap area.

To protect the user privacy and avoid the influence on the original menu interface as much as possible, under normal circumstances, the application icons arranged at the gap are hidden, and only when the user needs the application icons, these application icons are displayed in a specific operation mode.

In any above technical solution, preferably, the execution unit includes: a collaboration unit used for, when the application icon arranged in the gap area is used as the starting point of the operation track, establishing an association relationship between an application identified by the application icon located on the starting point and the applications identified by other application icons on the operation track, and then completing the association operation.

When arranging the application icon in the gap, the user can establish a certain association relationship between other application icons on the desktop and the application icon in the gap with the application icon in the gap as the operation starting point, and the association relationship is related to the function type of the application icon at the starting point of the operation track. For example, if the application icon at the starting point is synchronization cloud, the association relationship is established for the other applications on the operation track and the synchronization cloud, and the data of other applications are synchronized to the cloud through the synchronization cloud.

In any above technical solution, preferably, the association operation includes at least one of the following:
implementing data synchronization on the applications scribed by the operation track, synchronizing the data of the applications to the cloud, binding the accounts of the applications to the cloud and/or binding the accounts of the applications to each other.

In any above technical solution, preferably, the display control unit is further used for making the application icon arranged in the gap area between the application icons include a mode handover switch identifier.

In any above technical solution, preferably, the execution unit includes: a display mode handover unit used for, when the mode handover switch identifier is used as the starting point of the operation track, carrying out hidden display or amplified display on the application icons located on the operation track, and redeploying the arrangement positions of the application icons on the terminal to complete the display mode handover of the terminal.

Besides the association and collaboration of the applications, the shortcut operation can also carry out handover on the display mode. In view of different display modes of the terminal, the requirements on the display states of the application icons are different. For example, in a children mode, game applications are expected to be hidden, then the user can scribe the game applications along the run of the grid path with the handover switch identifier as the starting point to simultaneously hide the scribed game applications instead of deleting or hiding the game applications one by one, thereby facilitating the operation of the user.

According to another aspect of the present invention, a terminal is further provided, including: an input device, used for receiving a trigger of the user; an output device, used for displaying or hiding an application icon; a memory, used for storing an operation instruction; and a processor, used for invoking the operation instruction stored in the memory to execute the following operations: arranging, in a gap area between application icons on a terminal screen, an application icon not present on a current menu page of the terminal or an application icon not present on each of all the menu pages of the terminal.

With the increase of the screen size, the gap areas between the application icons become larger as well, in order to utilize these gap areas, certain specific application icons can be arranged in the gap areas, and the specific application icons can be application icons of shortcut operations, application icons or control identifiers or shortcut entry identifiers involving user privacy, application icons often used by a user but not present in the current menu page, or application icons not arranged on each of all the menu pages, and so on. In this way, not only are the application icons accommodated in each menu page increased, the user is convenient to use some common applications, but also the number of the menu pages can also be decreased.

In the above technical solution, preferably, the processor invokes the operation instruction stored in the memory to further execute the following operations: identifying an operation track of the user acting on the terminal screen; judging whether the operation track is consistent with the run of a grid path, wherein the grid path is composed of the gap areas between the application icons on a terminal desktop; and if so, executing shortcut operations associated with the applications scribed by the operation track.

The user can execute various touch operations on the terminal screen, the terminal identifies the tracks of the touch actions, and when the tracks of the touch operations conform to the requirements of the grid path, certain shortcut operations can be triggered and executed. In order to solve the problem of mistrigger, in the solution, it is defined that only when the operation track of the user conforms to the run of the grid path, the operation track is deemed to conform to the requirements, and the operation track can involve a plurality of applications, and when the operation track conforms to the requirements, certain shortcut operations can be executed for these involved applications, for example, these applications are collaboratively associated or the display mode of the terminal is changed.

In any above technical solution, preferably, the processor invokes the operation instruction stored in the memory to further execute the following operations: when the input device receives the trigger of the user, displaying the application icon in the gap area by the output device, and when the input device does not receive the trigger of the user, hiding the application icon in the gap area by the output device.

To protect the user privacy and avoid the influence on the original menu interface as much as possible, under normal circumstances, the application icons arranged at the gaps are hidden, and only when the user needs the application icons, these application icons are displayed in a specific operation mode.

In any above technical solution, preferably, the processor invokes the operation instruction stored in the memory to further execute the following operations: when the application icon arranged in the gap area is used as the starting point of the operation track, establishing an association relationship between an application identified by the application icon located on the starting point and the applications identified by other application icons on the operation track, and then completing an association operation related to the application icon at the starting point.

When arranging the application icon in the gap, the user can establish a certain association relationship between other application icons on the desktop and the application icon in the gap with the application icon in the gap as the operation starting point, and the association relationship is related to the function type of the application icon at the starting point of the operation track. For example, if the application icon at the starting point is synchronization cloud, the association relationship is established for the other applications on the operation track and the synchronization cloud, and the data of other applications are synchronized to the cloud through the synchronization cloud.

In any above technical solution, preferably, the association operation includes at least one of the following: implementing data synchronization on the applications scribed by the operation track, synchronizing the data of the applications to the cloud, binding the accounts of the applications to the cloud and/or binding the accounts of the applications to each other.

In any above technical solution, preferably, the processor invokes the operation instruction stored in the memory to further execute the following operation: the application icon arranged in the gap area between the application icons includes a mode handover switch identifier.

In any above technical solution, preferably, the processor invokes the operation instruction stored in the memory to further execute the following operations: when the mode handover switch identifier is used as the starting point of the operation track, carrying out hidden display or amplified display on the application icons located on the operation track by the output device, and redeploying the arrangement positions of the application icons on the terminal to complete the display mode handover of the terminal.

Besides the association and collaboration of the applications, the shortcut operation can also carry out handover on the display mode. In view of different display modes of the terminal, the requirements on the display states of the application icons are different. For example, in a children mode, game applications are expected to be hidden, then the user can scribe the game applications along the run of the grid path with the handover switch identifier as the starting point to simultaneously hide the scribed game applications instead of deleting or hiding the game applications one by one, thereby facilitating the operation of the user.

According to the present invention, the gap distances between the icons are utilized, the application icons are arranged at the gaps of different positions, the application icon corresponds to a certain shortcut operation, when the operation track of the user conforms to the run of the grid path, the association relationship between the applications passed by the operation track is established, so a plurality of applications arranged on different positions thereof can automatically establish certain association (for example, data synchronization, simultaneous hiding of the application icons), and thus the operation of the user is simplified.

According to yet another aspect of the present invention, a program product stored on a nonvolatile machine-readable medium is further provided, the program product is used for display control, and the program product includes a machine executable instruction used for driving a computer system to execute the following step: arranging, in a gap area between application icons on a terminal screen, an application icon not present on a current menu page of the terminal or an application icon not present on each of all the menu pages of the terminal.

According to yet another aspect of the present invention, a nonvolatile machine-readable medium is further provided, a program product for display control is stored on the nonvolatile machine-readable medium, and the program product includes a machine executable instruction used for driving a computer system to execute the following step: arranging, in a gap area between application icons on a terminal screen, an application icon not present on a current menu page of the terminal or an application icon not present on each of all the menu pages of the terminal.

According to still another aspect of the present invention, a machine readable program is further provided, and the program drives a machine to execute the display control method in any above technical solution.

According to still another aspect of the present invention, a storage medium storing a machine readable program is further provided, wherein the machine readable program drives a machine to execute the display control method in any above technical solution.

DETAILED DESCRIPTION OF THE EMBODIMENTS

In order that the above purposes, features and advantages of the present invention can be understood more clearly, a further detailed description of the present invention will be given below in combination with the accompany drawings and specific implementations. It should be noted that, embodiments of the present application and the features in the embodiments can be combined with each other as long as no conflict is generated.

A lot of specific details are described in the following description to fully understand the present invention, but the present invention can also be implemented in other forms different from what is described herein, and thus the protection scope of the present invention is not limited by the specific embodiments disclosed below.

Figure 1:
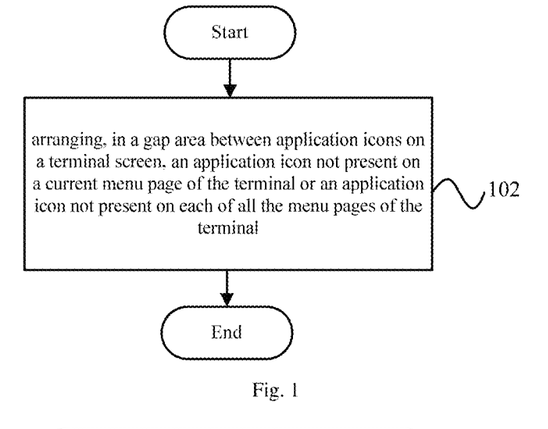
FIG. 1 shows a flowchart of a display control method according to an embodiment of the present invention.

FIG. 1 shows a flowchart of a display control method according to an embodiment of the present invention.

As shown in FIG. 1, the display control method according to the embodiment of the present invention can include the following step: step 102, arranging, in a gap area between application icons on a terminal screen, an application icon not present on a current menu page of the terminal or an application icon not present on each of all the menu pages of the terminal.

With the increase of the screen size, the gap areas between the application icons become larger as well, in order to utilize these gap areas, certain specific application icons can be arranged in the gap areas, and the specific application icons can be application icons of shortcut operations, application icons or control identifiers or shortcut entry identifiers involving user privacy, application icons often used by a user but not present in the current menu page, or application icons not arranged on each of all the menu pages, and so on. In this way, not only the application icons accommodated in each menu page are increased, the user is convenient to use some common applications, and the number of the menu pages can also be decreased.

In the above technical solution, preferably, identifying an operation track of the user acting on the terminal screen; judging whether the operation track is consistent with the run of a grid path, wherein the grid path is composed of the gap areas between the application icons on a terminal desktop; and if so, executing shortcut operations associated with the applications scribed by the operation track.

The application icons on the terminal desktop are regularly arranged in general, for example, in a grid manner, and the application icons naturally form a set of grid paths based on gaps.

The user can execute various touch operations on the terminal screen, the terminal identifies the tracks of the touch actions, and when the tracks of the touch operations conform to the requirements of the grid path, certain shortcut operations can be triggered and executed. In order to solve the problem of mistrigger, in the solution, it is defined that only when the operation track of the user conforms to the run of the grid path (for example, if the application icons are arranged in a Sudoku form, then the grid path is a regular Sudoku form and is composed of horizontal and longitudinal paths. When the user completes an operation track, the operation track should be composed of horizontal and longitudinal tracks, namely being consistent with the path direction of the grid path, and such operation track is effective), the operation track is deemed to conform to the requirements, and the operation track can involve a plurality of applications, and when the operation track conforms to the requirements, certain shortcut operations can be executed for these involved applications, for example, these applications are collaboratively associated or the display mode of the terminal is changed.

In any above technical solution, preferably, the display control method can further include: arranging, in the gap area between the application icons, an application icon not present on a current menu page of the terminal or an application icon not present on each of all the menu pages of the terminal.

Application icons or control identifiers or shortcut entry identifiers involving user privacy can be arranged at the gaps between the application icons, in this way, the number of the menu pages can be decreased, and more application icons can be distributed in one menu page.

In any above technical solution, preferably, when receiving a trigger of the user, the application icon in the gap area is displayed, and when not receiving the trigger of the user, the application icon in the gap area is hidden.

To protect the user privacy and avoid the influence on the original menu interface as much as possible, under normal circumstances, the application icons arranged at the gap are hidden, and only when the user needs the application icons, these application icons are displayed in a specific operation mode.

In any above technical solution, preferably, when the application icon arranged in the gap area is used as the starting point of the operation track, an association relationship between an application identified by the application icon located on the starting point and the applications identified by other application icons on the operation track is established, and then an association operation related to the application icon at the starting point is completed.

When arranging the application icon in the gap, the user can establish a certain association relationship between other application icons on the desktop and the application icon in the gap with the application icon in the gap as the operation starting point, and the association relationship is related to the function type of the application icon at the starting point of the operation track. For example, if the application icon at the starting point is synchronization cloud, the association relationship is established for the other applications on the operation track and the synchronization cloud, and the data of other applications are synchronized to the cloud through the synchronization cloud.

In any above technical solution, preferably, the association operation includes at least one of the following: implementing data synchronization on the applications scribed by the operation track, synchronizing the data of the applications to the cloud, binding the accounts of the applications to the cloud and/or binding the accounts of the applications to each other.

In any above technical solution, preferably, the application icon arranged in the gap area between the application icons includes a mode handover switch identifier.

In any above technical solution, preferably, when the mode handover switch identifier is used as the starting point of the operation track, hidden display or amplified display is carried out on the application icons located on the operation track, and the arrangement positions of the application icons on the terminal are redeployed to complete the display mode handover of the terminal.

Besides the association and collaboration of the applications, the shortcut operation can also carry out handover on the display mode. In view of different display modes of the terminal, the requirements on the display states of the application icons are different. For example, in a children mode, game applications are expected to be hidden, then the user can scribe the game applications along the run of the grid path with the handover switch identifier as the starting point to simultaneously hide the scribed game applications instead of deleting or hiding the game applications one by one, thereby facilitating the operation of the user.

The display control method according to the present invention will be further illustrated below in combination with FIG. 2 to FIG. 5.

Figure 2:
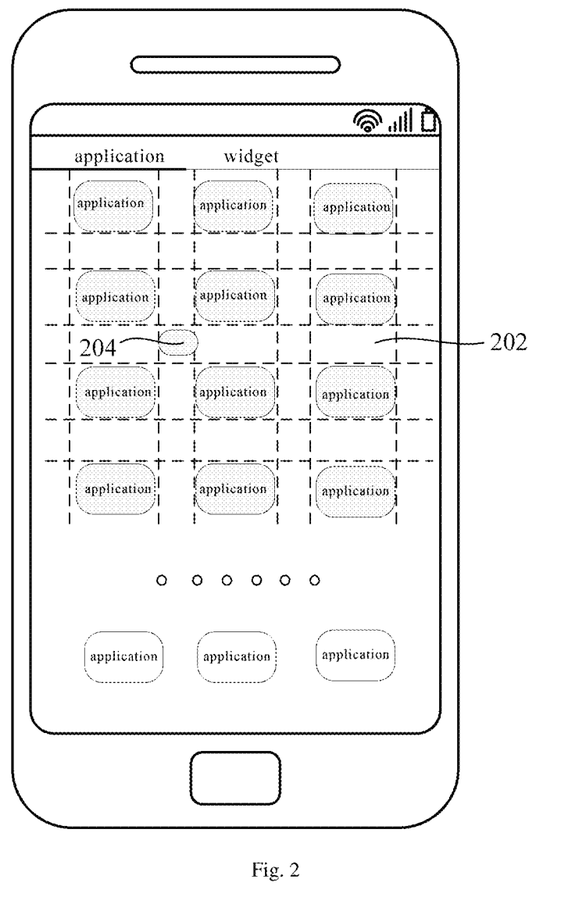
FIG. 2 shows a schematic diagram of a grid path according to an embodiment of the present invention.

The grid path according to the present invention is shown by 202 in FIG. 2, and due to the grid form distribution of the application icons on the desktop, the grid path based on the gaps between the application icons is formed. Application icons 204 can be arranged in the grid path, and the application icons 204 can be some controls or shortcut operation entries. In this way, more icons can be distributed in the menu pages, and thus the number of the menu pages is decreased.

Figure 3:
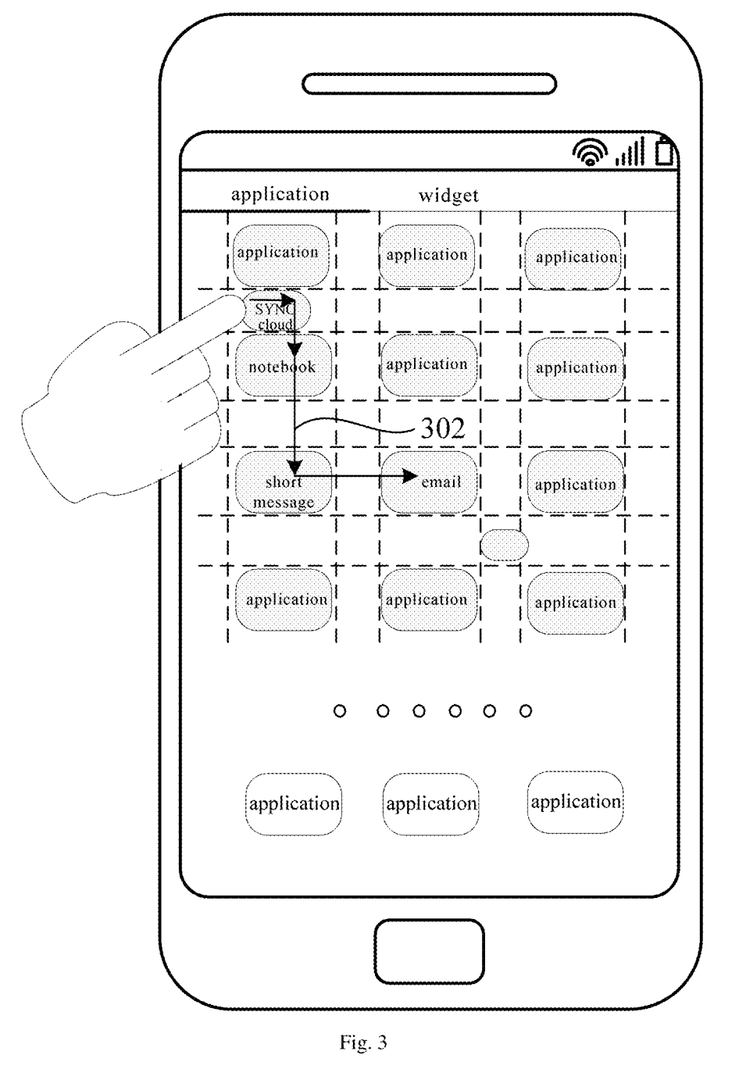
FIG. 3 shows a schematic diagram of an operation track according to an embodiment of the present invention.

With the increase of the terminal screen, the gaps between the application icons become larger as well, so the grid path based on the gaps is formed, and the grid path is fully utilized in the present invention to realize the shortcut operations between the applications. As shown in FIG. 3, the user carries out touch operations on the terminal screen and scribes the operation track along the run of the grid path, since the grid paths are vertically intersected, each corner in the operation track of the user is a right angle, in order to conform to the run of the grid path. In FIG. 3, the operation track of the user passes by synchronization cloud, notebook, short message, email and other application icons, wherein the synchronization cloud is an application icon arranged in the gap. Since the synchronization cloud is at the starting point of the operation track and the synchronization cloud is a synchronous operation, when determining that the operation track of the user conforms to the run of the grid path, association and collaboration with the notebook, the short message and the email are established through the synchronization cloud. The data of the notebook, the short message and the email are synchronized to the cloud. In this way, the user does not need to carry out cloud synchronization on each application setting one by one and realizes the cloud synchronization in one step, thereby greatly simplifying the operation of the user.

Figure 4:
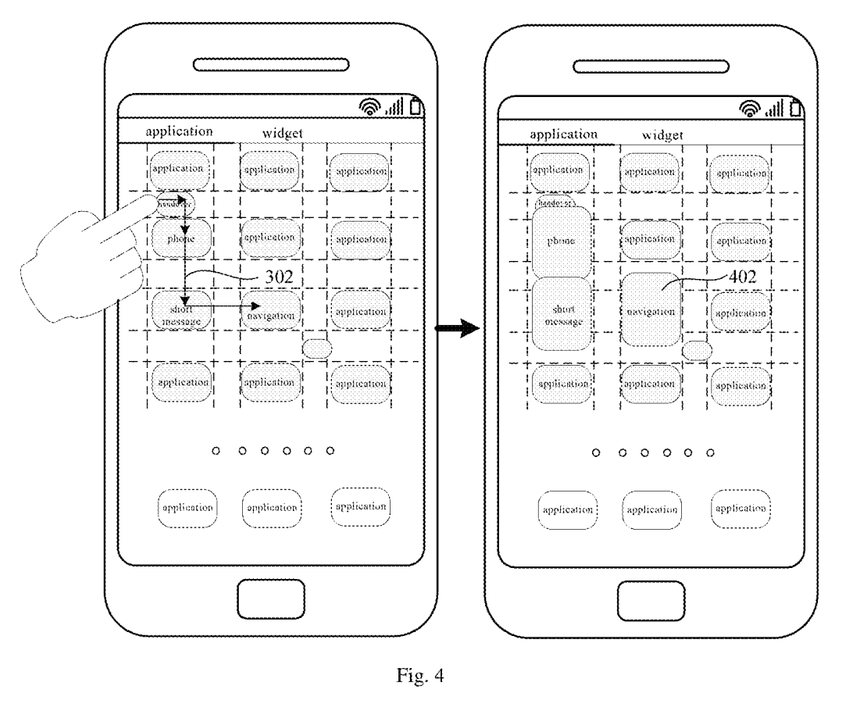
FIG. 4 shows a schematic diagram of updating a display mode according to an embodiment of the present invention.

Then, as shown in FIG. 4, when a driving mode handover operation control is located at the starting point of the operation track, the handover operation control is associated with the following application icons passed by the operation tracks to realize the handover of the driving mode: phone, short message and navigation, when judging that the operation track of the user conforms to the run of the grid path, the three application icons, namely phone, short message and navigation are amplified for display, because during driving, a finger of the user cannot flexibly touch the mobile phone, so by means of such shortcut operation, the user only needs to scribe the application icons subjected to amplified display to simultaneously amplify the three application icons to facilitate the operation of the user on the three application icons, and the user does not need to zoom the application icons one by one, thereby greatly reducing the operation steps of the user and contributing to safe driving.

Figure 5:
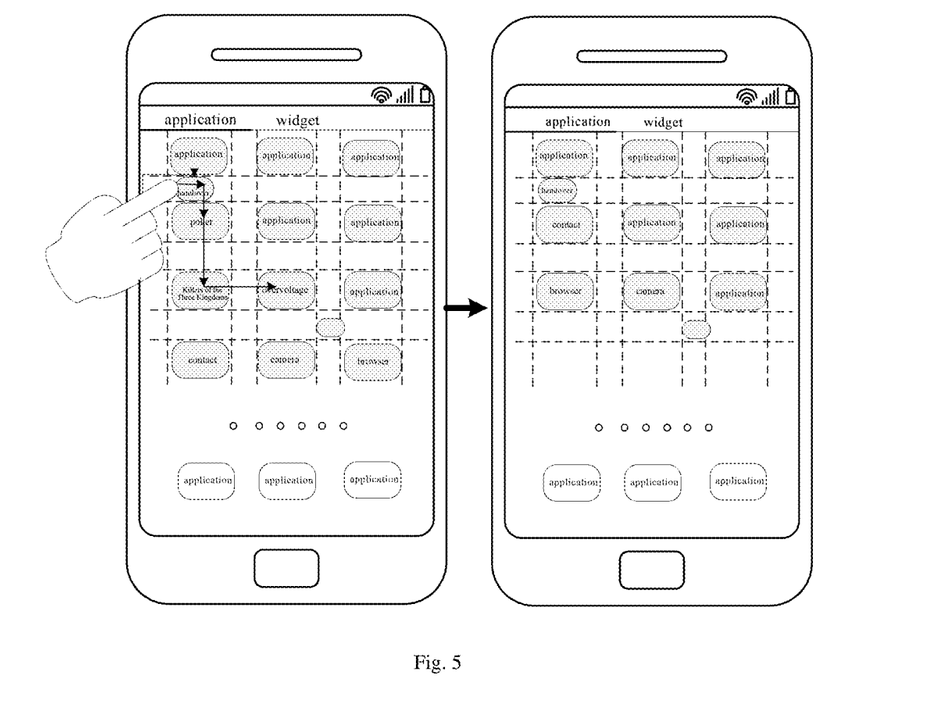
FIG. 5 shows a schematic diagram of updating a display mode according to an embodiment of the present invention.

As shown in FIG. 5, when a children mode handover operation control is located at the starting point of the operation track, to hide games in the mobile phone, the current method is to delete the game icons, resulting in that the user needs to reset the game application icons in next use, thereby being very inconvenient. By adopting the solution of the present invention, the game applications are scribed starting from the handover operation control to hide a plurality of game application icons by one touch action. In FIG. 5, Poker Game, Killers of the Three Kingdoms and Overvoltage passed by the operation track are hidden, so the application icons of Contact, Camera and Browser at the lower side fill in the blanks, and the desktop is redeployed. When the user needs to display the hidden game icons again, the game icons can be displayed again by a specific operation mode (for example, drawing a circle).

The operation track shown in the figure is merely an example, in practical operation, the touch operation can be randomly executed according to the positions of the application icons and the run of the grid path, and thus this manner reinforces the relationship between the applications, forms collaborative association of the applications, realizes the shortcut operations and improves the operation efficiency.

Figure 6:
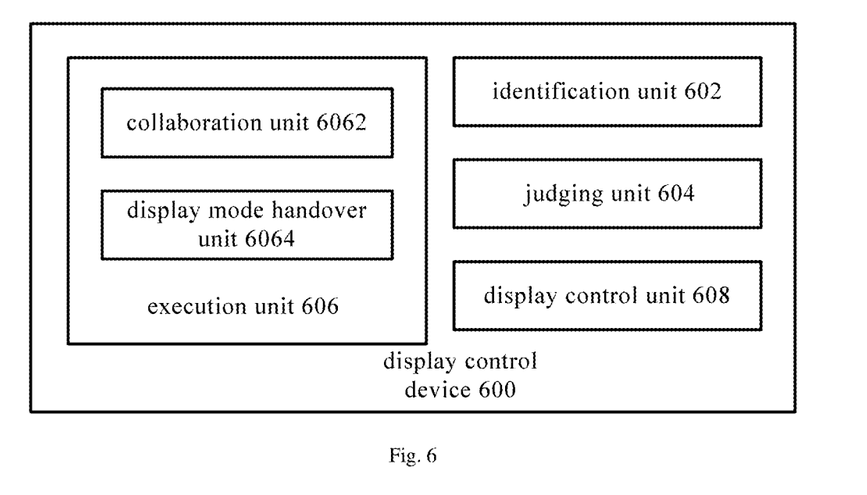
FIG. 6 shows a block diagram of a display control device according to an embodiment of the present invention.

FIG. 6 shows a block diagram of a display control device according to an embodiment of the present invention.

As shown in FIG. 6, the display control device 600 according to the embodiment of the present invention includes: a display control unit 608 used for arranging, in a gap area between application icons, an application icon not present on a current menu page of the terminal or an application icon not present on each of all the menu pages of the terminal.

With the increase of the screen size, the gap areas between the application icons become larger as well, in order to utilize these gap areas, certain specific application icons can be arranged in the gap areas, and the specific application icons can be application icons of shortcut operations, application icons or control identifiers or shortcut entry identifiers involving user privacy, application icons often used by a user but not present in the current menu page, or application icons not arranged on each of all the menu pages, and so on. In this way, not only the application icons accommodated in each menu page are increased, the user is convenient to use some common applications, and the number of the menu pages can also be decreased.

In the above technical solution, preferably, the display control device can further include: an identification unit 602, used for identifying an operation track of the user acting on the terminal screen; a judging unit 604, connected to the identification unit 602 and used for judging whether the operation track is consistent with the run of a grid path, wherein the grid path is composed of the gap areas between the application icons on a terminal desktop; and an execution unit 606, connected to the judging unit 604 and used for executing shortcut operations associated with the applications scribed by the operation track, when the judgment result of the judging unit 604 is positive.

The user can execute various touch operations on the terminal screen, the terminal identifies the tracks of the touch actions, and when the tracks of the touch operations conform to the requirements of the grid path, certain shortcut operations can be triggered and executed. In order to solve the problem of mistrigger, in the solution, it is defined that only when the operation track of the user conforms to the run of the grid path, the operation track is deemed to conform to the requirements, and the operation track can involve a plurality of applications, and when the operation track conforms to the requirements, certain shortcut operations can be executed for these involved applications, for example, these applications are collaboratively associated or the display mode of the terminal is changed.

In any above technical solution, preferably, the display control unit 608 is further used for, when receiving a trigger of the user, displaying the application icon in the gap area, and when not receiving the trigger of the user, hiding the application icon in the gap area. To protect the user privacy and avoid the influence on the original menu interface as much as possible, under normal circumstances, the application icons arranged at the gap are hidden, and only when the user needs the application icons, these application icons are displayed in a specific operation mode.

In any above technical solution, preferably, the execution unit 606 includes: a collaboration unit 6062 used for, when the application icon arranged in the gap area is used as the starting point of the operation track, establishing an association relationship between an application identified by the application icon located on the starting point and the applications identified by other application icons on the operation track, and then completing the association operation.

When arranging the application icon in the gap, the user can establish a certain association relationship between other application icons on the desktop and the application icon in the gap with the application icon in the gap as the operation starting point, and the association relationship is related to the function type of the application icon at the starting point of the operation track. For example, if the application icon at the starting point is synchronization cloud, the association relationship is established for the other applications on the operation track and the synchronization cloud, and the data of other applications are synchronized to the cloud through the synchronization cloud.

In any above technical solution, preferably, the association operation includes at least one of the following:
  implementing data synchronization on the applications scribed by the operation track, synchronizing the data of the applications to the cloud, binding the accounts of the applications to the cloud and/or binding the accounts of the applications to each other.

In any above technical solution, preferably, the display control unit 608 is further used for making the application icon arranged in the gap area between the application icons include a mode handover switch identifier.

In any above technical solution, preferably, the execution unit 606 includes: a display mode handover unit 6064 used for, when the mode handover switch identifier is used as the starting point of the operation track, carrying out hidden display or amplified display on the application icons located on the operation track, and redeploying the arrangement positions of the application icons on the terminal to complete the display mode handover of the terminal.

Besides the association and collaboration of the applications, the shortcut operation can also carry out handover on the display mode. In view of different display modes of the terminal, the requirements on the display states of the application icons are different. For example, in a children mode, game applications are expected to be hidden, then the user can scribe the game applications along the run of the grid path with the handover switch identifier as the starting point to simultaneously hide the scribed game applications instead of deleting or hiding the game applications one by one, thereby facilitating the operation of the user.

Figure 7:
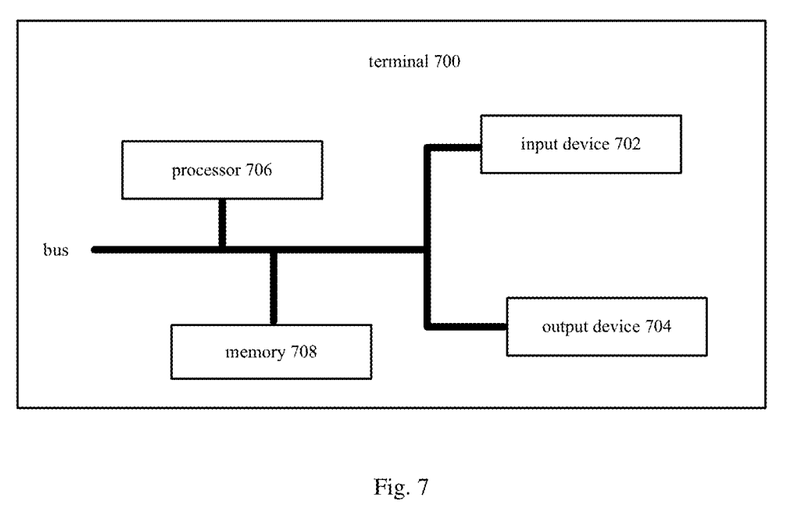
FIG. 7 shows a block diagram of a terminal according to an embodiment of the present invention.

FIG. 7 shows a block diagram of a terminal according to an embodiment of the present invention.

As shown in FIG. 7, the terminal 700 according to the embodiment of the present invention includes: an input device 702, an output device 704, a processor 706 and a memory 708 (wherein, one or more processors can be arranged in the terminal 700, and one processor 706 is taken as an example in FIG. 7). In some embodiments of the present invention, the input device 702, the output device 704, the processor 706 and the memory 708 can be connected by buses or in other manners, and bus connection is taken as an example in FIG. 7.

Wherein, the input device 702 is used for receiving a trigger of the user, for example, receiving a trigger instruction or a trigger action of the user; the output device 704 is used for displaying or hiding an application icon; the memory 708 is used for storing an operation instruction; and the processor 706 is used for invoking the operation instruction stored in the memory 708 to execute the following operation: arranging, in a gap area between application icons on a terminal screen, an application icon not present on a current menu page of the terminal or an application icon not present on each of all the menu pages of the terminal.

With the increase of the screen size, the gap areas between the application icons become larger as well, in order to utilize these gap areas, certain specific application icons can be arranged in the gap areas, and the specific application icons can be application icons of shortcut operations, application icons or control identifiers or shortcut entry identifiers involving user privacy, application icons often used by a user but not present in the current menu page, or application icons not arranged on each of all the menu pages, and so on. In this way, not only are the application icons accommodated in each menu page increased, the user is convenient to use some common applications, but also the number of the menu pages can also be decreased.

In the above technical solution, preferably, the processor 706 invokes the operation instruction stored in the memory 708 to further execute the following operations: identifying an operation track of the user acting on the terminal screen; judging whether the operation track is consistent with the run of a grid path, wherein the grid path is composed of the gap areas between the application icons on a terminal desktop; and if so, executing shortcut operations associated with the applications scribed by the operation track.

The user can execute various touch operations on the terminal screen, the terminal identifies the tracks of the touch actions, and when the tracks of the touch operations conform to the requirements of the grid path, certain shortcut operations can be triggered and executed. In order to solve the problem of mistrigger, in the solution, it is defined that only when the operation track of the user conforms to the run of the grid path, the operation track is deemed to conform to the requirements, and the operation track can involve a plurality of applications, and when the operation track conforms to the requirements, certain shortcut operations can be executed for these involved applications, for example, these applications are collaboratively associated or the display mode of the terminal is changed.

In any above technical solution, preferably, the processor 706 invokes the operation instruction stored in the memory 708 to further execute the following operations: when the input device 702 receives the trigger of the user, displaying the application icon in the gap area by the output device 704, and when the input device 702 does not receive the trigger of the user, hiding the application icon in the gap area by the output device 704.

To protect the user privacy and avoid the influence on the original menu interface as much as possible, under normal circumstances, the application icons arranged at the gaps are hidden, and only when the user needs the application icons, these application icons are displayed in a specific operation mode.

In any above technical solution, preferably, the processor 706 invokes the operation instruction stored in the memory 708 to further execute the following operations: when the application icon arranged in the gap area is used as the starting point of the operation track, establishing an association relationship between an application identified by the application icon located on the starting point and the applications identified by other application icons on the operation track, and then completing an association operation related to the application icon at the starting point.

When arranging the application icon in the gap, the user can establish a certain association relationship between other application icons on the desktop and the application icon in the gap with the application icon in the gap as the operation starting point, and the association relationship is related to the function type of the application icon at the starting point of the operation track. For example, if the application icon at the starting point is synchronization cloud, the association relationship is established for the other applications on the operation track and the synchronization cloud, and the data of other applications are synchronized to the cloud through the synchronization cloud.

In any above technical solution, preferably, the association operation includes at least one of the following: implementing data synchronization on the applications scribed by the operation track, synchronizing the data of the applications to the cloud, binding the accounts of the applications to the cloud and/or binding the accounts of the applications to each other.

In any above technical solution, preferably, the processor 706 invokes the operation instruction stored in the memory 708 to further execute the following operation: the application icon arranged in the gap area between the application icons includes a mode handover switch identifier.

In any above technical solution, preferably, the processor 706 invokes the operation instruction stored in the memory 708 to further execute the following operations: when the mode handover switch identifier is used as the starting point of the operation track, carrying out hidden display or amplified display on the application icons located on the operation track by the output device 704, and redeploying the arrangement positions of the application icons on the terminal to complete the display mode handover of the terminal.

Besides the association and collaboration of the applications, the shortcut operation can also carry out handover on the display mode. In view of different display modes of the terminal, the requirements on the display states of the application icons are different. For example, in a children mode, game applications are expected to be hidden, then the user can scribe the game applications along the run of the grid path with the handover switch identifier as the starting point to simultaneously hide the scribed game applications instead of deleting or hiding the game applications one by one, thereby facilitating the operation of the user.

According to yet another aspect of the present invention, a program product stored on a nonvolatile machine-readable medium is further provided, the program product is used for display control, and the program product includes a machine executable instruction used for driving a computer system to execute the following step: arranging, in a gap area between application icons on a terminal screen, an application icon not present on a current menu page of the terminal or an application icon not present on each of all the menu pages of the terminal.

According to yet another aspect of the present invention, a nonvolatile machine-readable medium is further provided, a program product for display control is stored on the nonvolatile machine-readable medium, and the program product includes a machine executable instruction used for driving a computer system to execute the following step: arranging, in a gap area between application icons on a terminal screen, an application icon not present on a current menu page of the terminal or an application icon not present on each of all the menu pages of the terminal.

According to still another aspect of the present invention, a machine readable program is further provided, and the program drives a machine to execute the display control method in any above technical solution.

According to still another aspect of the present invention, a storage medium storing a machine readable program is further provided, wherein the machine readable program drives a machine to execute the display control method in any above technical solution.

The technical solutions of the present invention have been illustrated above in combination with the accompany drawings. According to the present invention, the gap distances between the icons are utilized, the application icons are arranged at the gaps of different positions, the application icon corresponds to a certain shortcut operation, when the operation track of the user conforms to the run of the grid path, the association relationship between the applications passed by the operation track is established, so a plurality of applications arranged on different positions thereof can automatically establish certain association (for example, data synchronization, simultaneous hiding of the application icons), and thus the operation of the user is simplified.

The foregoing descriptions are merely preferred embodiments of the present invention, rather than limiting the present invention, and for those skilled in the art, the present invention can have a variety of variations and modifications. Any modifications, equivalent substitutions, improvements or the like made within the spirit and principle of the present invention shall all fall into the protection scope of the present invention.

The invention claimed is:
1. A display control method, comprising:
identifying, by a terminal processor, a gap area between first application icons that are displayed on a terminal screen;
receiving, by the terminal processor, a touch point in the gap area;
displaying, by the terminal processor, a second application icon in the gap area in response to the touch point, wherein the second application icon is hidden before receiving the touch point and comprises a mode handover switch identifier;
receiving, by the terminal process, an operation track along which the touch point moves on the terminal screen;
identifying, by the terminal process, the operation track that consists of at least one of a horizontal track or a longitudinal track;
selecting, by the terminal processor, the second application icon as a starting point of the operation track on the terminal screen that passes at least one first application icon and the second application icon, wherein in response to the second application icon being the mode handover switch identifier, amplifying, by the terminal processor, a display of the at least one first application icon; and establishing, by the terminal processor, an association relationship amongst the second application icon and the at least one first application icon.

2. The display control method of claim 1, further comprising:

judging whether the operation track is consistent with a run of a grid path, wherein the grid path is composed of the gap area between the first application icons on the terminal screen; and in response to the operation track being consistent with the run of the grid path, executing operations associated with the second application icon and the at least one first application icon passed by the operation track.

3. The display control method of claim 2, further comprising:

performing, on the at least one first application icon, an association operation related to the second application icon at the starting point.

4. The display control method of claim 3, wherein the association operation comprises at least one of the following:

implementing data synchronization on an application of the second application icon and at least one other application of the at least one first application icon passed by the operation track, synchronizing the data of the at least one other application to a cloud, binding accounts of the at least one other application to the cloud, or binding the accounts of the at least one other application to each other.

5. The display control method of claim 1, wherein in response to the mode handover switch identifier being used as the starting point of the operation track, further comprising:

hiding the display of the at least one first application icon; and redeploying arrangement positions of the first application icons on the terminal screen to complete the mode handover of the terminal screen.

6. The display control method of claim 1, wherein the operation track passes at least two first application icons.

7. The display control method of claim 6, wherein operation track passes at least three first application icons arranged along both the horizontal track and the longitudinal track.

8. The display control method of claim 6, wherein the second application icon is surrounded by the first application icons horizontally and vertically.

9. The display control method of claim 1, further comprising maintaining, by the terminal processor, the positions, on the terminal screen, of the at least one first applications and the second application passed by the operation track.

10. A terminal device, comprising:
a terminal screen; and
a terminal processor configured to:
identify a gap area between first application icons that are displayed on a terminal screen;
receive a touch point in the gap area;
display a second application icon in the gap area in response to the touch point, wherein the second application icon is hidden before receiving the touch point and comprises a mode handover switch identifier;
receive an operation track along which the touch point moves on the terminal screen;

identify the operation track that consists of at least one of a horizontal track or a longitudinal track;
select the second application icon as a starting point of the operation track on the terminal screen that passes at least one first application icon and the second application icon, wherein in response to the second application icon being the mode handover switch identifier, amplify a display of the at least one first application icon; and
establish an association relationship amongst the second application icon and the at least one first application icon.

11. The terminal device of claim 10, wherein the terminal processor is further configured to:
judge whether the operation track is consistent with a run of a grid path, wherein the grid path is composed of the gap area between the first application icons on the terminal screen; and
in response to the operation track being consistent with the run of the grid path, execute operations associated with the second application icon and the at least one first application icon passed by the operation track.

12. The terminal device of claim 11, wherein the terminal processor is further configured to:
perform, on the at least one first application icon, an association operation related to the second application icon at the starting point.

13. The terminal device of claim 12, wherein the association operation comprises at least one of the following:
implementing data synchronization on an application of the second application icon and at least one other application of the at least one first application icon passed by the operation track, synchronizing the data of the at least one other application to a cloud, binding accounts of the at least one other application to the cloud, or binding the accounts of the at least one other application to each other.

14. The terminal device of claim 10, wherein the terminal processor is further configured to:
in response to the mode handover switch identifier being used as the starting point of the operation track, hide the display of the at least one first application icon, and
redeploy arrangement positions of the first application icons on the terminal screen to complete the display mode handover of the terminal screen.

15. A terminal, comprising:
an input device, configured to receive a touch point of a user;
an output device configured to display or hide an application icon;
a memory configured to store an operation instruction; and
a processor configured to invoke the operation instruction stored in the memory to execute the following operations:
determining the touch point is received in a gap area between first application icons that are displayed on the terminal;
displaying a second application icon in the gap area in response to the touch point, wherein the second application icon is hidden before receiving the touch point and comprises a mode handover switch identifier;
receiving an operation track along which the touch point moves on the terminal screen;
identifying the operation track that consists of at least one of a horizontal track or a longitudinal track;

selecting the second application icon as a starting point of the operation track on the terminal that passes at least one first application icon and the second application icon, wherein in response to the second application icon being the mode handover switch identifier, amplifying a display of the at least one first application icon; and establishing an association relationship amongst the second application icon and the at least one first application.

* * * * *